United States Patent
Haltom et al.

(10) Patent No.: US 9,948,759 B1
(45) Date of Patent: Apr. 17, 2018

(54) NETWORK BASED CALL AUTHENTICATION

(71) Applicant: Verizon Patent and Licensing Inc., Arlington, VA (US)

(72) Inventors: Jeffrey Haltom, Fishers, IN (US); Joseph G. Oleska, Prosper, TX (US); Vincent T. Lally, White Plains, NY (US); Heath W. Hendrickson, McKinney, TX (US); Kevin V. Bohn, Rockville Centre, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/293,538

(22) Filed: Oct. 14, 2016

(51) Int. Cl.
| | |
|---|---|
| *H04M 1/56* | (2006.01) |
| *H04M 15/06* | (2006.01) |
| *H04M 1/663* | (2006.01) |
| *H04M 3/527* | (2006.01) |
| *H04L 29/06* | (2006.01) |

(52) U.S. Cl.
CPC ........ *H04M 1/663* (2013.01); *H04L 63/0876* (2013.01); *H04M 3/527* (2013.01); *H04M 2203/6027* (2013.01); *H04M 2215/62* (2013.01)

(58) Field of Classification Search
USPC .............................. 379/142.01, 142.05, 188
See application file for complete search history.

(56) References Cited

U.S. PATENT DOCUMENTS

| | | | |
|---|---|---|---|
| 8,774,379 B1* | 7/2014 | Youngs ................. | H04M 15/06 379/142.02 |
| 9,277,049 B1* | 3/2016 | Danis ................. | H04M 3/42042 |
| 2008/0181379 A1* | 7/2008 | Chow ................. | H04L 63/0823 379/142.05 |
| 2011/0026699 A1* | 2/2011 | Amir ..................... | H04M 15/06 379/142.05 |
| 2012/0287823 A1* | 11/2012 | Lin ................... | H04M 3/42042 370/259 |
| 2014/0233715 A1* | 8/2014 | Sterman ............ | H04M 3/42042 379/142.05 |

* cited by examiner

*Primary Examiner* — Quoc D Tran (57) ABSTRACT

A device may receive, from a network device, a resolution query associated with a call. The resolution query may include a device identifier of the network device. The network device may receive, from a user device, the call. The device may determine, based on the device identifier of the network device, whether an authentication condition is satisfied. The device may selectively provide, to the network device, an authentication token in association with the resolution query based on determining whether the authentication condition is satisfied. The authentication token may enable an endpoint device, associated with the call, to perform a particular action based on the call.

20 Claims, 8 Drawing Sheets

NETWORK BASED CALL AUTHENTICATION

BACKGROUND

For a call (e.g., a toll-free call, or the like), network originating and/or user device originating information may be provided via in-band synchronous signaling to an endpoint device (e.g., a service processing element). The endpoint device may determine an authentication level associated with the call based on the information.

DETAILED DESCRIPTION OF PREFERRED EMBODIMENTS

The following detailed description of example implementations refers to the accompanying drawings. The same reference numbers in different drawings may identify the same or similar elements.

An entity (e.g., a telecommunications service provider) may provide telephone numbers (e.g., 800 numbers, 844 numbers, 855 numbers, etc.) that users (e.g., subscribers) may call to access account information, purchase items or services, provide inquiries, or the like. Calls placed to such numbers may be routed to endpoint devices, such as interactive voice response (IVR) devices that provide particular services. For example, an endpoint device may receive a call, determine call information (e.g., a calling number associated with the call), or the like, and determine particular actions to perform based on the call information (e.g., lookup an account associated with the calling number, request particular information from the calling party, or the like).

In some cases, the call that is placed to the endpoint device may have its identity spoofed. That is, the endpoint device may determine a calling number, associated with the call, that is not the actual calling number of the device that placed the call. For example, a malicious party may provide counterfeit credentials to imitate a subscriber of the entity. In such cases, the malicious party may spoof the call to engage in nefarious and/or illegal activity, such as obtaining personal information, ordering goods or services at the cost of the subscriber, using data to defraud subscribers, requesting calls to be forwarded to the malicious party, or the like.

Implementations described herein enable network devices to pre-authenticate a call based on in-band signaling (e.g., as the call is routed through a network). For example, a first network device (e.g., a call routing database device) may receive information associated with a second network device (e.g., an ingress switching device that is providing access to the user device that is placing a call to a dialed number), determine that the second network device is associated with a particular entity (e.g., a telecommunications service provider associated with the dialed number), and provide an authentication token based on the second network device being associated with the particular entity. Additionally, implementations described herein enable a third network device (e.g., a call resolution database and/or screening device) to receive information that identifies the authentication token, determine an authentication level associated with the call based on the authentication token and/or other call information, and provide, to a fourth network device (e.g., a network switching device, such as a long distance switching device), information that identifies the authentication level. The fourth network device may route the call to a particular endpoint device, and provide the information that identifies the authentication level associated with the call.

In this way, the endpoint device may receive the call, identify the information that identifies the authentication level, and determine that the user device that placed the call is connected to (e.g., communicating via) the second network device and/or is not connected to an intermediate device (e.g., a network device that is not associated with the particular entity). Based on receiving the call, identifying the information that identifies the authentication level, and determining that the user device is connected to the second network device and/or is not connected to an intermediate device, the endpoint device may determine that the call is pre-authenticated (e.g., the likelihood of the call being spoofed is reduced).

Additionally, or alternatively, implementations described herein enable the endpoint device to perform particular actions based on the information that identifies the authentication level, such as access account information, route the call to another device, or the like. In this way, the need for the endpoint device to perform additional actions, such as request additional authentication information, may be reduced. In this way, the amount of time associated with processing of calls may be reduced and/or an amount of information requested of user devices may be reduced, or the like, thereby conserving processor and/or memory resources of endpoint devices and user devices, and conserving network resources. Additionally, implementations described herein may reduce an amount of spoofed calls that result in malicious actions such as defrauding subscribers, and/or may reduce an amount of additional calls needed to rectify malicious activity, thereby conserving processor and/or memory resources of user devices, endpoint devices, and/or conserving network resources.

Figure 1A:
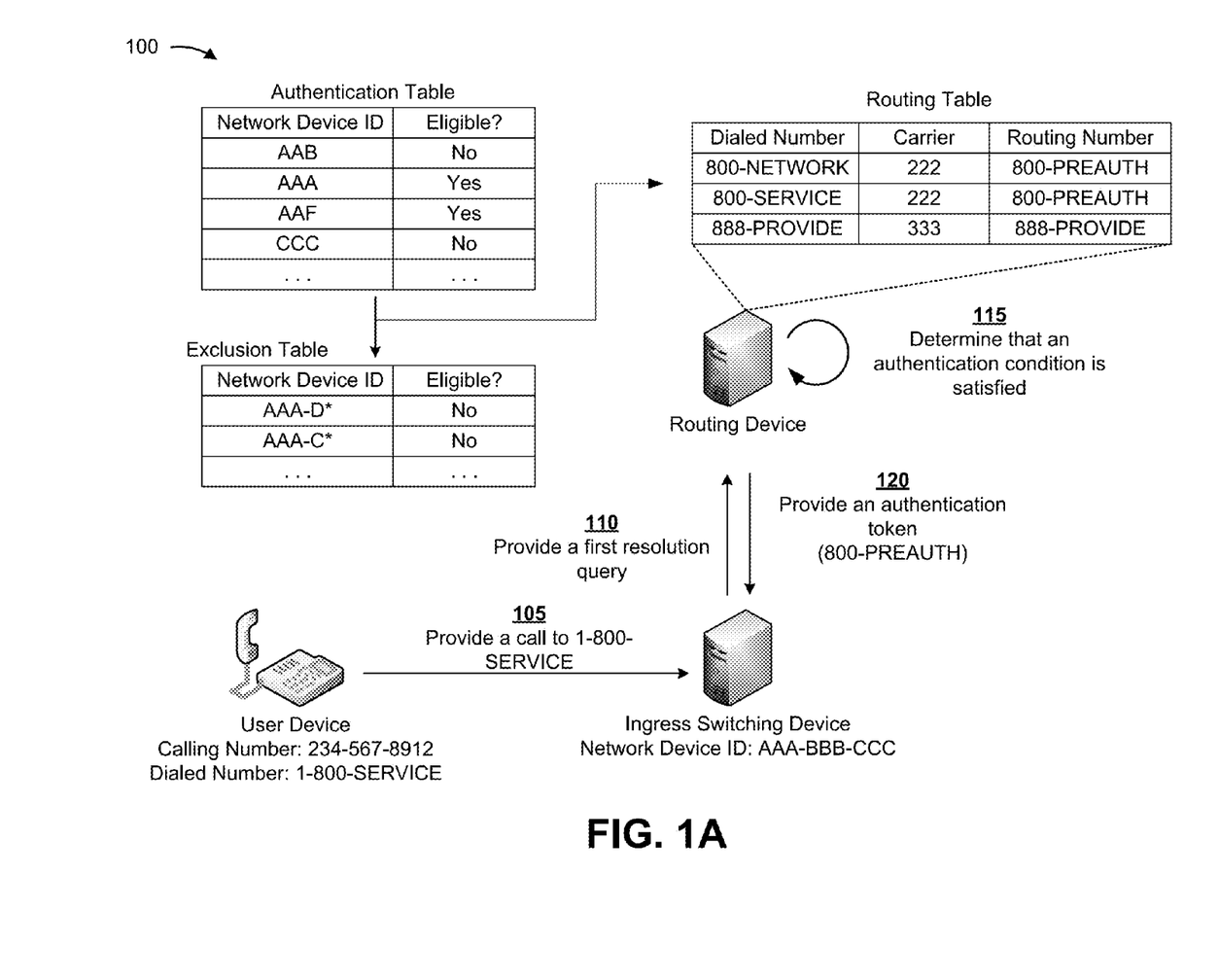
FIGS. 1A-1E are diagrams of an overview of an example implementation described herein.

FIGS. 1A-1E are diagrams of an overview of an example implementation 100 described herein. As shown in FIG. 1A, and by reference number 105, a user device (e.g., a telephone) may provide a call to a dialed number (e.g., a toll-free number, such as "1-800-SERVICE"). As shown, an ingress switching device (e.g., a class 5 switch) may receive the call. As shown by reference number 110, the ingress switching device may provide a first resolution query to a routing device (e.g., a database server) for resolution of the call (e.g., to identify a carrier to route the call). In some implementations, the first resolution query may include call information associated with the call, such as a user device identifier (e.g., "234-567-8912"), a network device identifier (e.g., a point code, an Internet Protocol (IP) address, or the like) of the ingress switching device (e.g., "AAA-BBB-CCC"), the dialed number (e.g., "1-800-SERVICE"), and/or the like.

As shown by reference number 115, the routing device may determine that an authentication condition is satisfied. For example, the routing device may determine, based on information associated with a data structure (e.g., an "Authentication Table"), that the ingress switching device is eligible to receive an authentication token. As an example, the routing device may determine, based on the network device identifier of the ingress switching device, that the ingress switching device is associated with a particular entity (e.g., a telecommunications service provider that is associated with the dialed number). For example, as shown, the routing device may determine, based on the authentication table and particular values associated with the network device identifier (e.g., "AAA"), that the ingress switching device is eligible to receive the authentication token.

In some implementations, the routing device may determine, based on another data structure (e.g., an "Exclusion Table"), that the ingress switching device is eligible to receive the authentication token. For example, the exclusion table may store information that identifies particular ingress switching devices that may not be eligible to receive the authentication token (e.g., ingress switching devices that include network device identifiers having the values "AAA-D," or the like). In some implementations, the routing device may determine, based on performing one or more lookups using the one or more tables, that the ingress switching device is associated with the particular entity and/or that the that the ingress switching device is a particular type of ingress switching device (e.g., a class 5 switch). In other words, the routing device may determine whether the authentication condition is satisfied (e.g., whether the ingress switching device is eligible to receive the authentication token).

Additionally, the ingress switching device may determine, based on another data structure (e.g., a "Routing Table"), first routing information, such as a carrier identification code (CIC), and/or a routing number (e.g., "800-PREAUTH"). For example, the ingress switching device may determine the routing number based on the dialed number. As an example, assume that the authentication condition was not satisfied (e.g., based on the network device identifier not being eligible based on the authentication table or the exclusion table). In this case, the routing device may determine, based on another routing table, a different routing number based on the dialed number (e.g., as compared to situations where the authentication condition is satisfied). That is, if the authentication condition is not satisfied, then the routing device may determine a different muting number (e.g., "800-SERVICE") based on the dialed number (e.g., "800-SERVICE").

As further shown in FIG. 1A, and by reference number 120, the routing device may provide, to the ingress switching device, an authentication token (e.g., "800-PREAUTH") based on the authentication condition being satisfied. For example, the routing device may provide, to the ingress switching device, the first routing information that may include the authentication token. In other implementations, the routing device may adjust other information (e.g., call information and/or the first routing information) to include the authentication token. That is, while implementations described herein show particular call information and/or muting information as including information that identifies an authentication token and/or an authentication level, other implementations may include other call information and/or muting information as including the information that identifies the authentication token and/or the authentication level.

Figure 1B:
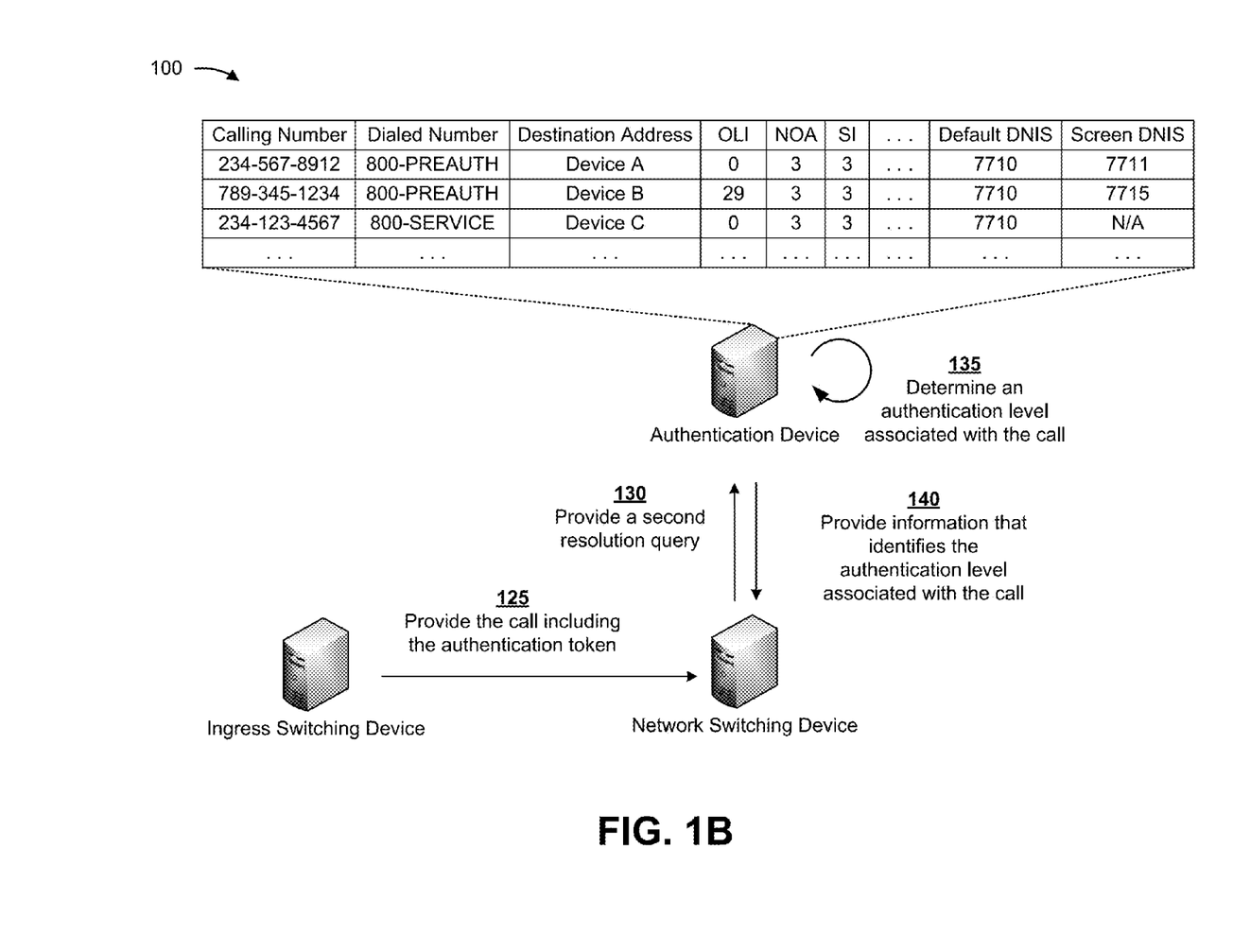

As shown in FIG. 1B, and by reference number 125, the ingress switching device may provide, to a network switching device (e.g., a long distance switch), the call including the authentication token. For example, the ingress switching device may route the call to a particular network switching device based on the first routing information (e.g., the CIC, or the like). While a single network switching device is shown in FIG. 1B, it should be understood that multiple network switching devices may route the call during processing of the call. As shown by reference number 130, the network switching device may provide, to an authentication device (e.g., a database server and/or service processing device), a second resolution query for resolution of the call (e.g., to identify an endpoint device to which to route the call). As an example, the second resolution query may include call information, such as the dialed number (e.g., "800-PREAUTH"), a user device identifier (e.g., a calling number, or the like), or the like.

As show by reference number 135, the authentication device may determine an authentication level associated with the call. For example, an authentication level may be indicative of the likelihood of the identity of the call being spoofed (e.g., highly likely, likely, unlikely, highly unlikely, etc.). In some implementations, the authentication device may determine an authentication level based on call information and/or the authentication token. For example, the authentication device may determine whether particular values associated with particular call information (e.g., originating line information (OLI), nature of address information (NOA), screening information (SI), or the like) satisfy particular thresholds, include particular values, or the like. Additionally, the authentication device may determine particular authentication levels associated with particular calls based on various combinations of call information. For example, particular tuples of call information may generate particular authentication levels.

As an example, assume that other user devices placed other calls to the same dialed number (e.g., "800-SERVICE"). As an example, the authentication device may determine a first authentication level for a first call (e.g., associated with calling number "234-567-8912") based on an authentication token (e.g., "800-PREAUTH") and a particular combination of values associated with call information (e.g., OLI=0, NOA=3, SI=3, etc.). Additionally, the authentication device may determine a second authentication level for a second call (e.g., associated with calling number "789-345-1234") based on an authentication token (e.g., "800-PREAUTH") and a particular combination of values associated with call information (e.g., OLI=29, NOA=3, SI=3, etc.). As an example, assume that the authentication level associated with the first call satisfies the authentication level associated with the second call (e.g., the likelihood of the second call having its identity spoofed is greater than a likelihood of the first call having its identify spoofed).

Additionally, the authentication device may determine a third authentication level for a third call (e.g., associated with calling number "234-123-4567") based on a lack of an authentication token (e.g., the dialed number does not include the authentication token), and a particular combination of values associated with call information (e.g., OLI=0, NOA=3, SI=3, etc.). As an example, assume that a user device associated with the third call is communicating via an ingress switching device that is not eligible to receive the authentication token. In this case, the third call is not associated with the authentication token (e.g., "800-PREAUTH").

In some implementations, the authentication device may determine second routing information based on the second resolution query (e.g., dialed number identification service (DNIS) information, information that identifies an endpoint device to which to route the call, or the like). As shown by reference number 140, the authentication device may provide information that identifies the authentication level associated with the call. For example, the authentication device may provide, to the network switching device, the second muting information that includes information that identifies the authentication level associated with the call.

For example, as shown, the authentication device may provide, for the first call, first DNIS information (e.g., "7711") based on the authentication level associated with the first call. Additionally, as shown, the authentication device may provide, for the second call and third call, respective DNIS information (e.g., "7715" and "7710," respectively) based on authentication levels associated with the respective calls. Additionally, as shown, the authentication device may provide different second routing information (e.g., identifying different endpoint devices) for the first, second, and third calls, respectively. In this way, and as an example, the last bit values in the respective DNIS information may be used by the respective endpoint devices to determine an authentication level associated with the call, as described below. That is, the value of the last bit of the DNIS information for the first call (e.g., "1") may identify that the first call is associated with an authentication level that satisfies an authentication level associated with the second call (e.g., identified by the value of the last bit of "5").

Figure 1C:
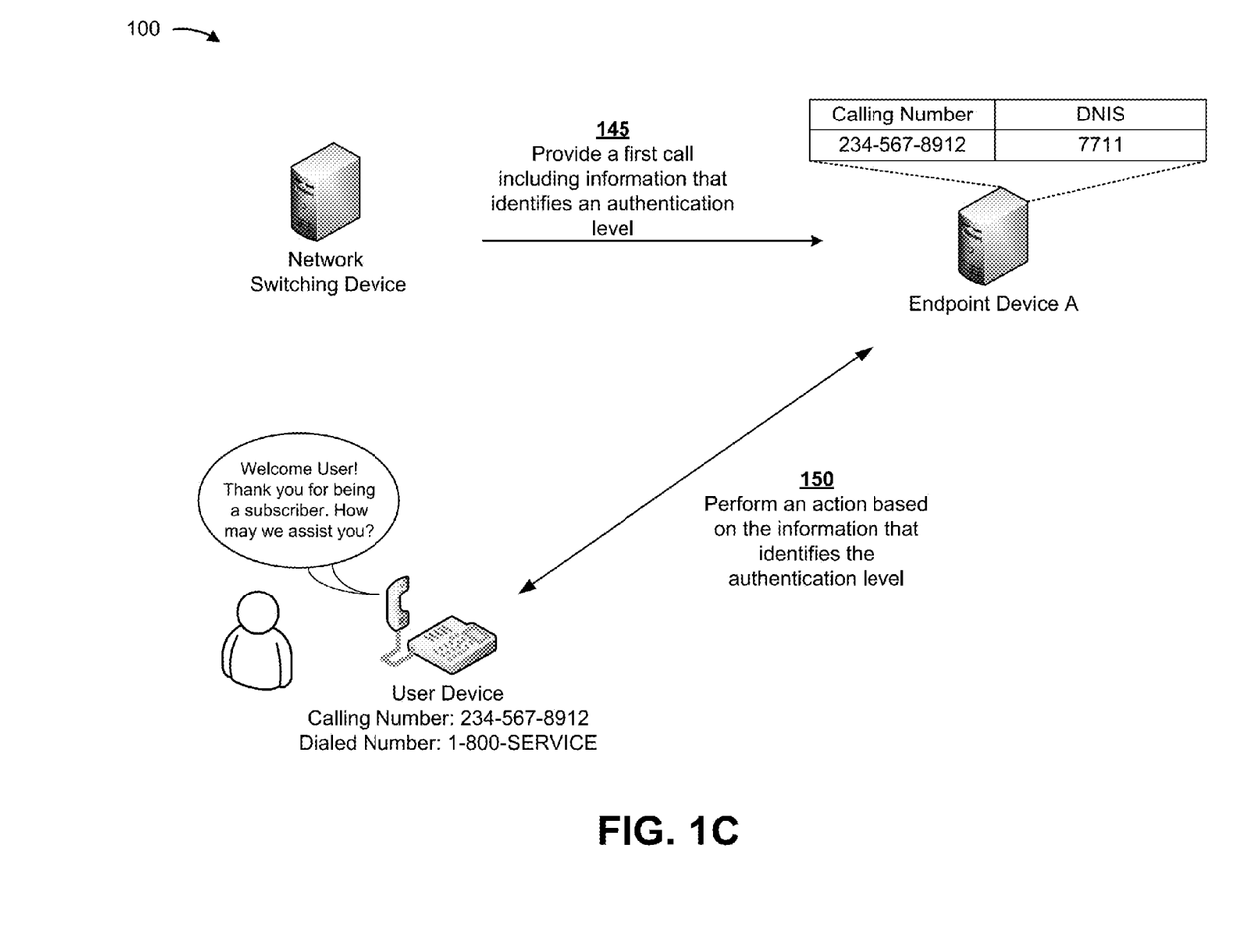

As shown in FIG. 1C, and by reference number 145, the network switching device may provide, to endpoint device A (e.g., an IVR server), the first call including information that identifies an authentication level (e.g., DNIS="7711"). As shown by reference number 150, endpoint device A may perform a particular action based on the authentication level associated with the first call. For example, endpoint device A may provide a message (e.g., "Welcome User! Thank you for being a subscriber. How may we assist you?") to the user device associated with the first call. As an example, a particular tuple (e.g., associated with call information) of the first call may indicate that the first call is "highly authenticated." That is, the likelihood that the identity of the first call being spoofed is low. In this case, endpoint device A may streamline call processing associated with the first call based on the information that identifies the authentication level.

Figure 1D:
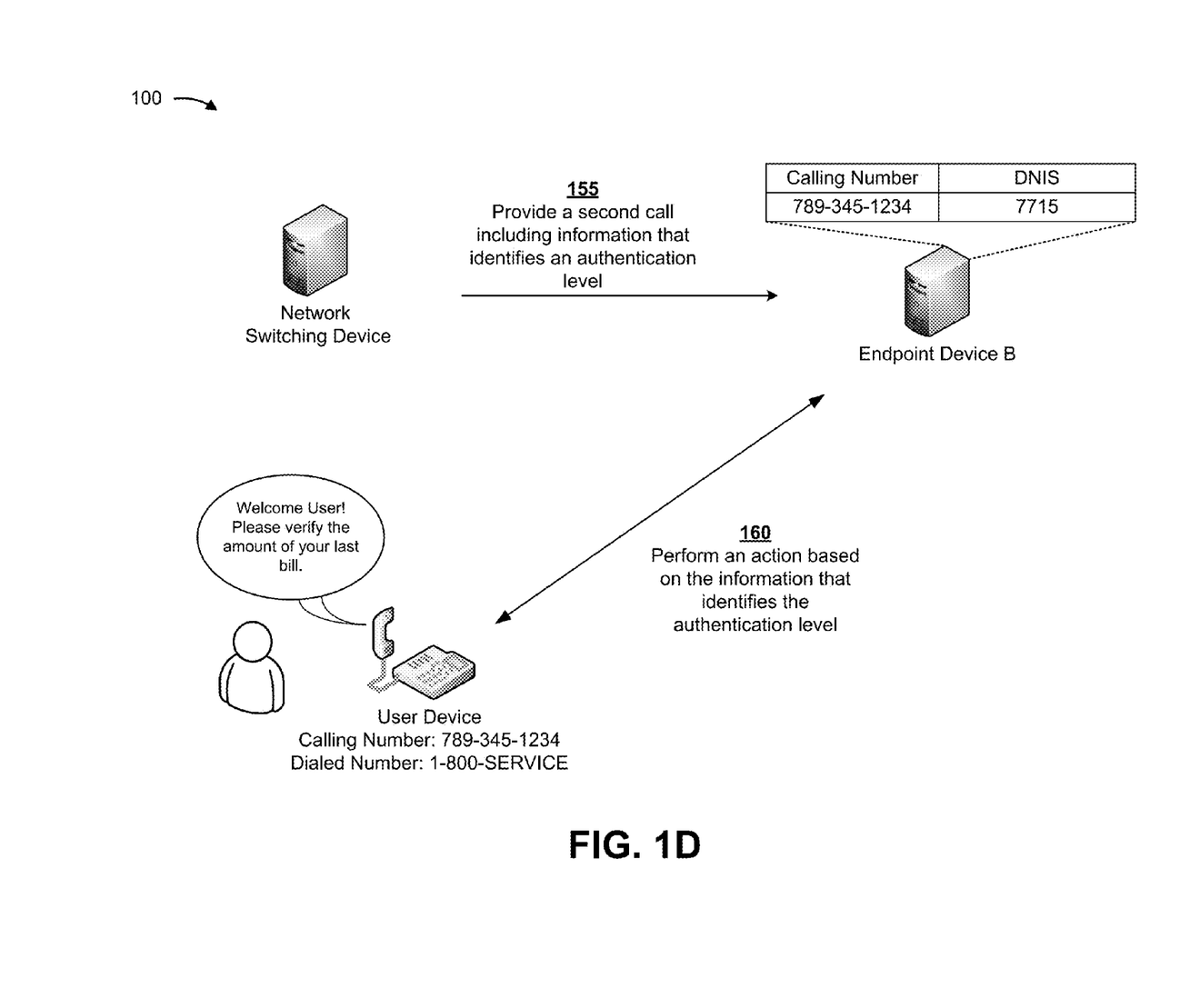

As shown in FIG. 1D, and by reference number 155, the network switching device may provide, to endpoint device B, the second call including information that identifies an authentication level (e.g., DNIS="7715"). As shown by reference number 160, endpoint device B may perform an action based on the authentication level associated with the second call. For example, endpoint device B may provide a message (e.g., "Welcome User! Please verify the amount of your last bill.") to the user device associated with the second call. For example, the authentication level of the second call may indicate that the likelihood of the second call having its identify spoofed is greater than the likelihood of the first call having its identify spoofed. Thus, the user associated with the second call may be required to provide additional information (e.g., as compared to the user associated with the first call) to verify an identity, or the like.

Figure 1E:
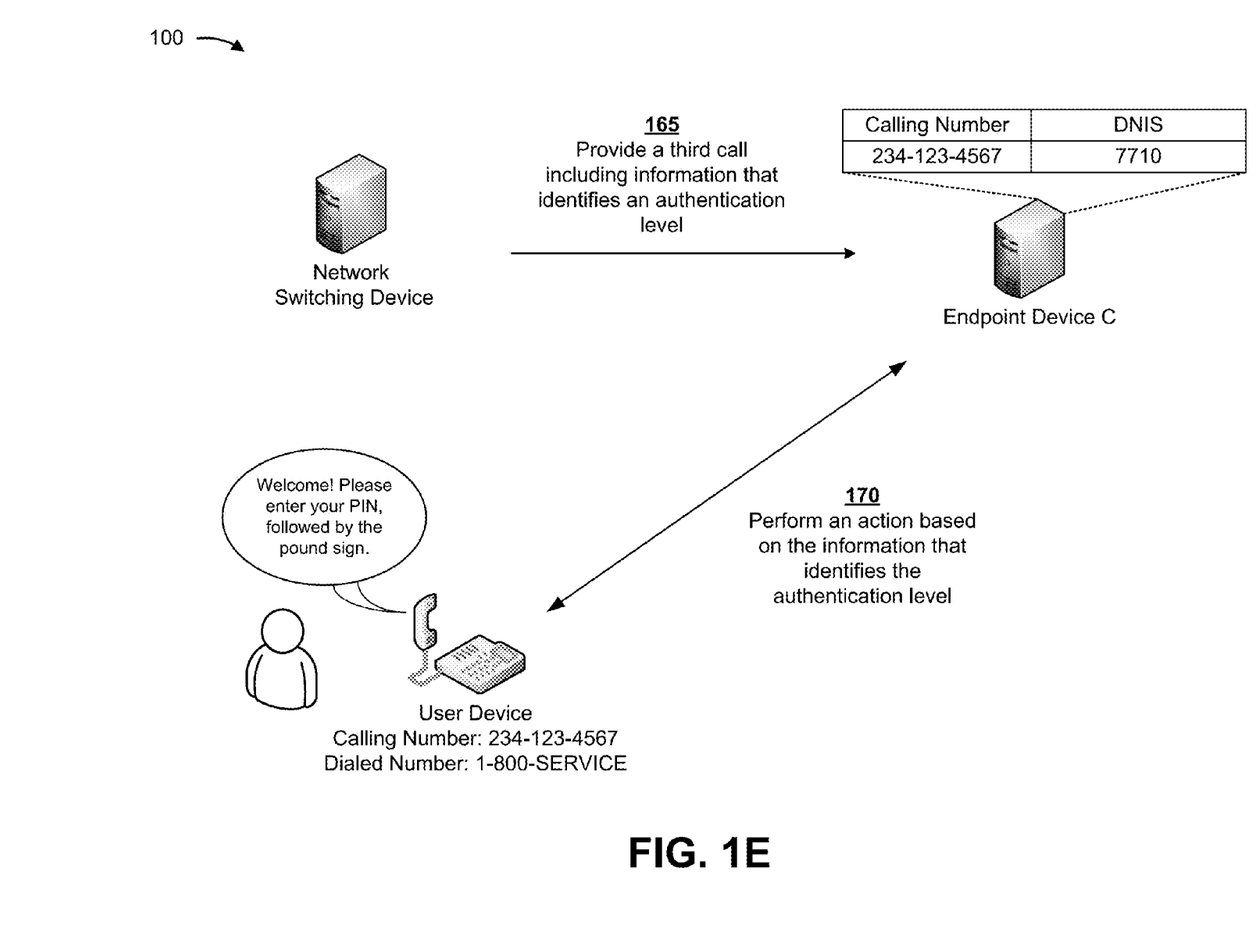

As shown in FIG. 1E, and by reference number 165, the network switching device may provide, to endpoint device C, the third call including information that identifies an authentication level (e.g., DNIS="7710"). As shown by reference number 170, endpoint device C may perform an action based on the information that identifies the authentication level. For example, endpoint device C may provide a message (e.g., "Welcome! Please enter your PIN, followed by the pound sign.") to the user device associated with the third call. For example, the authentication level of the third call may indicate that the likelihood of the third call having its identify spoofed is greater than the likelihood of the second call (and first call) having its identify spoofed. Thus, the user associated with the third call may be required to provide additional information (e.g., as compared to the user associated with the second call and as compared to the user of the first call) that identifies an account, verifies information, or the like.

In this way, an authentication device may determine an authentication level associated with a call based on an authentication token and/or call information, and provide information that identifies the authentication level to an endpoint device. Additionally, in this way, the endpoint device may receive the call, and perform particular actions in association with the call based on the information that identifies the authentication level.

Implementations described herein enable network devices to pre-authenticate a call, and enable endpoint devices to streamline call processing based on the call being pre-authenticated. In this way, implementations described herein may reduce an amount of time associated with calls, may reduce queue times for processing calls, and may reduce an amount of additional calls required to rectify the effects of a spoofed call. In this way, implementations described herein may conserve processor and/or memory resources of user devices, network devices, and/or endpoint devices associated with toll-free calls, and/or may conserve network resources.

As indicated above, FIGS. 1A-1E are provided merely as an example. Other examples are possible and may differ from what was described with regard to FIGS. 1A-1E.

Figure 2:
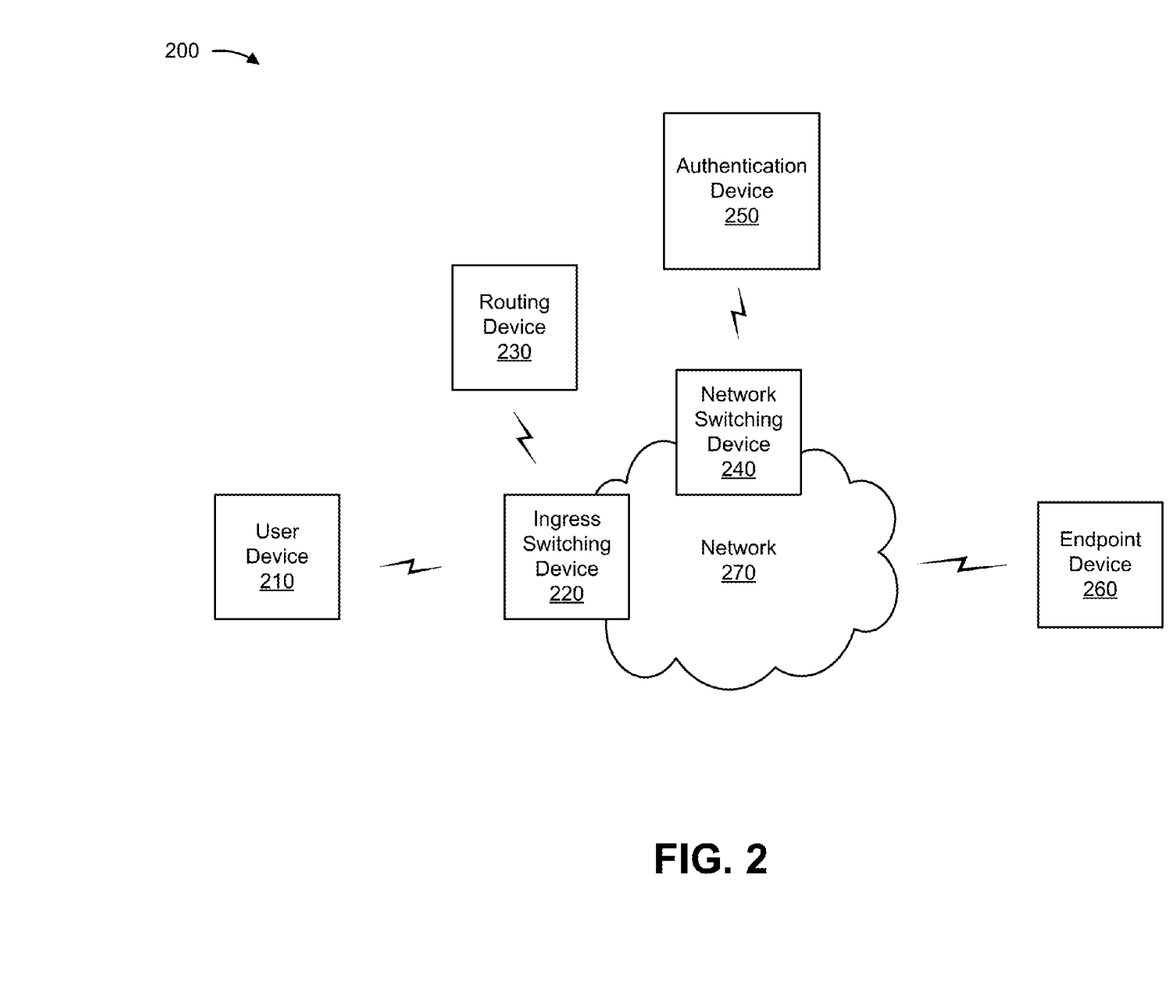
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an ingress switching device 220, a routing device 230, a network switching device 240, an authentication device 250, an endpoint device 260, and a network 270. Devices of environment 200 may interconnect via wired connections, wireless connections, or a combination of wired and wireless connections.

User device 210 includes a device that is capable of communicating with one or more other devices included in environment 200. For example, user device 210 may include a wired communication device, a plain old telephone service (POTS) telephone, a voice over Internet protocol (VoIP) telephone, a wireless communication device, a radiotelephone, a personal communications system ("PCS") terminal (e.g., that may combine a cellular radiotelephone with data processing and data communications capabilities), a smart phone, a desktop computer, a laptop computer, a tablet computer, a personal gaming system, a wearable communication device (e.g., a smart wristwatch, a pair of smart eyeglasses, or the like), a set-top box, a multi-media video system, and/or a similar device.

Ingress switching device 220 includes one or more devices capable of receiving, generating, processing, storing, and/or providing information associated with a call. For example, ingress switching device 220 may include a traffic transfer device, such as a server, a gateway, a router, a modem, a switch, a firewall, a network interface card ("NIC"), a hub, a bridge, an optical add/drop multiplexer ("OADM"), an end office switch, a softswitch, an Internet Protocol Multimedia Subsystem (IMS) core device, or the like. In some implementations, ingress switching device 220 may assist in establishing a connection between user device 210 and endpoint device 260 (e.g., ingress switching device 220 may include a terminating switch, an end office switch, a softswitch, a signaling system 7 ("SS7") class 4 switch, an SS7 class 5 switch, or the like). In some implementations, ingress switching device 220 may be associated with a local exchange carrier (LEC) end office. In some implementations, ingress switching device 220 may receive information associated with a call from one or more devices capable of transferring traffic, such as audio, video, text, and/or other traffic (e.g., a base station, such as an eNB associated with a long-term evolution (LTE) network, a gateway, a server, a VoIP server, or the like).

In some implementations, ingress switching device 220 may transmit identification information (e.g., call information) using a particular protocol (e.g., SS7, SS7 utilizing an Advanced Intelligent Network (AIN), session initiation protocol (SIP), or the like). In some implementations, ingress switching device 220 may generate and send (e.g., to routing device 230) queries and/or receive (e.g., from routing device 230) responses to queries. In some implementations, ingress switching device 220 may send call information (e.g., received from routing device 230) to network switching device 240. While some implementations are described herein in connection with a particular signaling protocol (e.g., SS7), other implementations may include other types of signaling protocols (e.g., SIP, H.323, remote authentication dial-in user service (RADIUS), signaling transport (SIGTRAN), or the like).

Routing device 230 includes one or more devices capable of receiving, processing storing, and/or providing information associated with an authentication token. For example, routing device 230 may include a computing device, such as a server (e.g., an application server, a database server, a host server, a web server, or the like), a network device, or a similar device. In some implementations, routing device 230 may receive a resolution query (e.g., associated with a toll-free call) from ingress switching device 220, and provide an authentication token to ingress switching device 220 based on a network device identifier of ingress switching device 220, as described elsewhere herein.

Network switching device 240 includes one or more devices capable of receiving, generating, processing, storing, and/or providing information associated with a call. For example, network switching device 240 may include a traffic transfer device, such as a server, a gateway, a router, a modem, a switch (e.g., a long distance switch), a firewall, a network interface card ("NIC"), a hub, a bridge, an optical add/drop multiplexer ("OADM"), an end office switch, a softswitch, an IMS core device, or the like.

Authentication device 250 includes one or more devices capable of receiving, processing, storing, and/or providing information associated with an authentication level. For example, authentication device 250 may include a computing device, such as a server (e.g., an application server, a database server, a host server, a web server, or the like), a network device, or a similar device. In some implementations, authentication device 250 may receive a resolution query from network switching device 240, identify an authentication token based on the first resolution query, determine an authentication level associated with the call based on the authentication token and/or other call information, and provide information that identifies the authentication level, as described elsewhere herein.

Endpoint device 260 includes one or more devices capable of receiving, processing, storing, and/or providing information associated with a call. For example, endpoint device 260 may include a computing device, such as a server (e.g., an application server, a database server, a host server, a web server, an interactive voice response (IVR) server, a server associated with a data center, or the like), a network device, or a similar device. In some implementations, endpoint device 260 may receive a call, identify information that identifies an authentication level based on the call, and perform particular actions based on the authentication level (e.g., may lookup account information, forward the call to a particular customer representative, or the like).

Network 270 includes one or more wired and/or wireless networks. For example, network 270 may include a cellular network (e.g., an LTE network, a third generation (3G) network, a code division multiple access (CDMA) network, or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
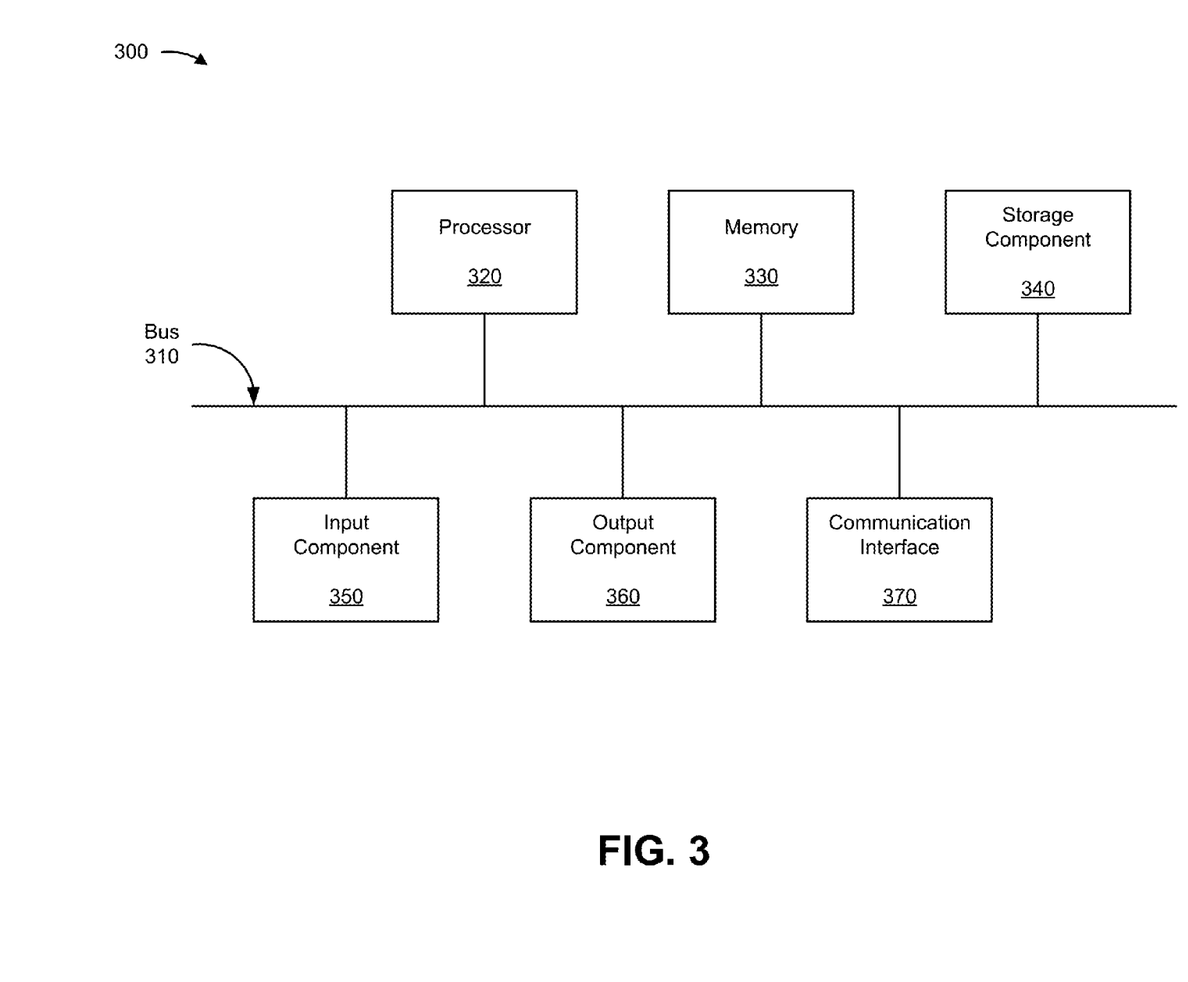
FIG. 3 is a diagram of example components of one or more devices of FIG. 2.

FIG. 3 is a diagram of example components of a device 300. Device 300 may correspond to user device 210, ingress switching device 220, routing device 230, network switching device 240, authentication device 250, and/or endpoint device 260. In some implementations, user device 210, ingress switching device 220, routing device 230, network switching device 240, authentication device 250, and/or endpoint device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
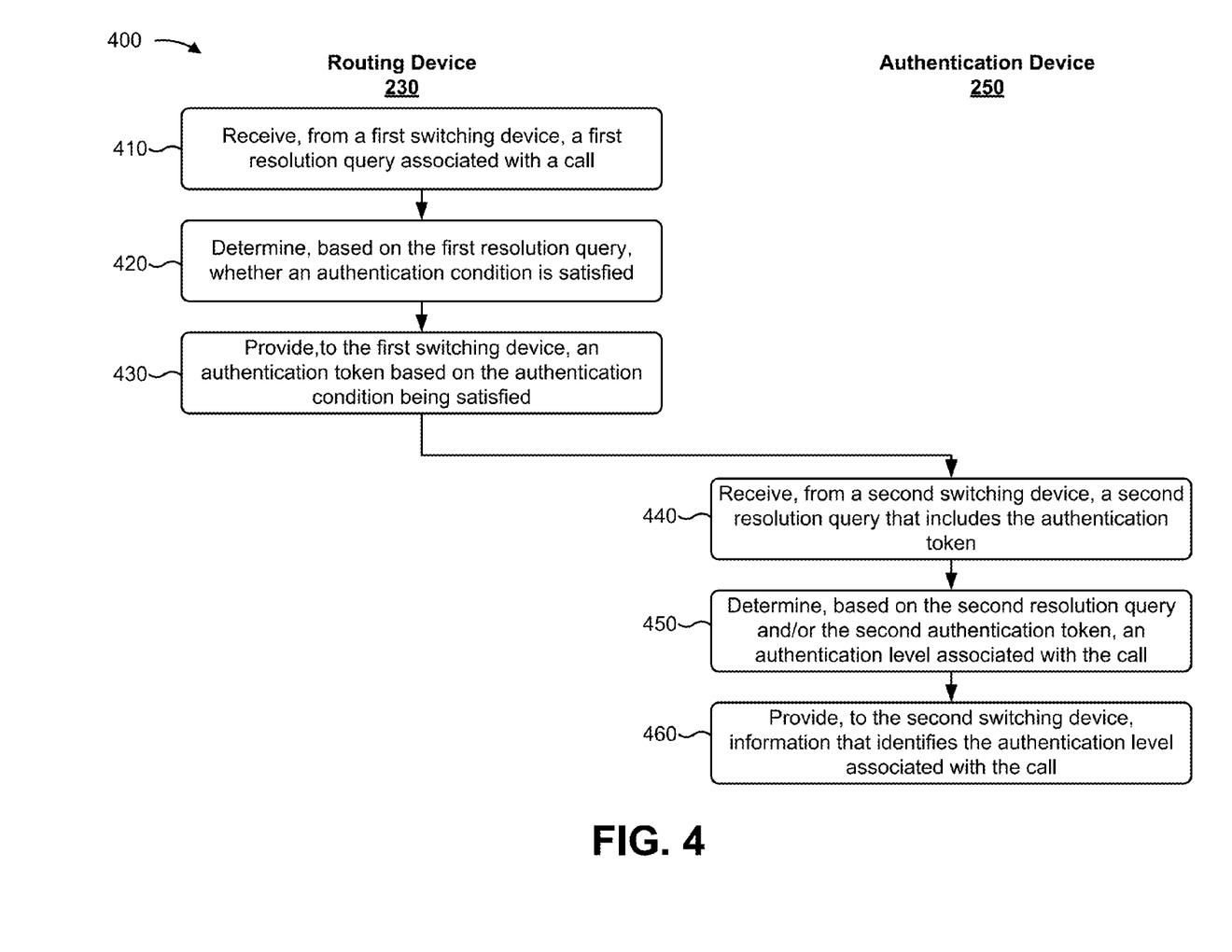
FIG. 4 is a flow chart of an example process for performing network based authentication of calls.

FIG. 4 is a flow chart of an example process 400 for performing network based authentication of calls. In some implementations, one or more process blocks of FIG. 4 may be performed by routing device 230 and/or authentication device 250. In some implementations, one or more process blocks of FIG. 4 may be performed by another device or a group of devices separate from or including routing device 230 and/or authentication device 250, such as user device 210, ingress switching device 220, network switching device 240, and/or endpoint device 260.

As shown in FIG. 4, process 400 may include receiving, from a first switching device, a first resolution query associated with a call (block 410). For example, routing device 230 may receive, from ingress switching device 220, a first resolution query associated with a call. In some implementations, user device 210 may provide, to ingress switching device 220, a request to establish a connection with endpoint device 260 (e.g., a call) based on a dialed number (e.g., based on a user dialing a telephone number, such as a toll-free telephone number, or the like). Additionally, or alternatively, ingress switching device 220 may receive the call, generate the first resolution query based on the call, and provide the first resolution query to routing device 230 for resolution of the dialed number associated with the call.

In some implementations, the first resolution query may include call information. In some implementations, call information may include information that identifies the dialed number, a user device identifier of user device 210 (e.g., a telephone number, an IP address, a Media Access Control (MAC) address, a mobile device number (MDN), an international mobile subscriber identity (IMSI), a temporary mobile subscriber identity (TMSI), or the like), a network device identifier of ingress switching device 220 (e.g., an SS7 point code, an IP address, a MAC address, or the like), and/or a type of ingress switching device 220 (e.g., an SS7 class 4 switch, an SS7 class 5 switch, etc.).

Additionally, or alternatively, the call information may include type of line information, such as information that identifies whether the originator of the call (e.g., user device 210) is associated with a POTS, a prison service, a cellular service, or the like (e.g., originating line information (OLI), or the like). Additionally, or alternatively, the call information may include address information, such as information that identifies whether user device 210 is associated with a national number, an international number, a local number, or the like (e.g., nature of address (NOA) information, type of number (TON) information, or the like). Additionally, or alternatively, the call information may include information that identifies a numbering plan of user device 210 (e.g., numbering plan indicator (NPI) information, or the like).

Additionally, or alternatively, the call information may include screening information, such as information that identifies a party that screened the call (e.g., a user, a network, or the like). Additionally, or alternatively, the call information may include charging information, such as information that identifies whether a charging party (e.g., a party to be charged) is associated with the call, or the like. In some implementations, routing device 230 may receive the first resolution query, and determine whether an authentication condition is satisfied, as described below.

As further shown in FIG. 4, process 400 may include determining, based on the first resolution query, whether an authentication condition is satisfied (block 420). For example, routing device 230 may receive the first resolution query and determine whether an authentication condition is satisfied. In some implementations, the authentication condition may be indicative of user device 210 being associated with a particular entity, may be indicative of a user device identifier (e.g., a calling number) of user device 210 not being spoofed, or the like.

In some implementations, routing device 230 may determine whether the authentication condition is satisfied based on call information associated with the call and/or the first resolution query. In some implementations, routing device 230 may determine whether the authentication condition is satisfied based on a network device identifier of ingress switching device 220 (e.g., that may be indicative of ingress switching device 220 being associated with a particular entity). For example, routing device 230 may determine, based on a network device identifier (e.g., an SS7 point code, an IP address, a MAC address, or the like), whether ingress switching device 220 is associated with a particular entity (e.g., a telecommunications service provider, or the like). In some implementations, the particular entity may be associated with the dialed number and/or endpoint device 260.

In some implementations, routing device 230 may store information (e.g., in one or more data structures, such as lookup tables, routing tables, or the like) that identifies particular network device identifiers (e.g., associated with ingress switching devices 220) that are eligible to be associated with the authentication condition and/or are eligible to receive authentication tokens, as described elsewhere herein. In some implementations, routing device 230 may determine that ingress switching device 220 is associated with a particular entity, and determine whether ingress switching device 220 is a particular type of ingress switching device 220, as described below.

In some implementations, routing device 230 may determine whether the authentication condition is satisfied based on a type of ingress switching device 220. For example, routing device 230 may store information that identifies one or more types of ingress switching devices 220 that may be associated with the authentication condition and/or are eligible to receive authentication tokens. As an example, routing device 230 may store information that identifies particular types of ingress switching device 220s that are not eligible to be associated with the authentication condition (e.g., SS7 class 4 switches, fiber-to-the-premises (FTTP) switches, or the like).

Additionally, or alternatively, routing device 230 may store information that identifies other types of ingress switching devices 220 that are eligible to be associated with the authentication condition (e.g., SS7 class 5 switches, or the like). For example, particular types of ingress switching devices 220 (e.g., SS7 class 5 switches) may provide more direct access for user devices 210 to network 270 (e.g., may not include intermediate ingress switching devices 220) than as compared to other types of ingress switching devices 220 (e.g., SS7 class 4 switches) that may route calls between ingress switching devices 220. In this way, particular types of ingress switching devices 220 may be less prone to spoofing than as compared to other types of ingress switching devices 220 (e.g., because other ingress switching devices 220 may not process signaling data between the SS7 class 5 switch and user device 210).

In some implementations, routing device 230 may determine a first authentication token for a first ingress switching device 220, and may determine a second authentication token that is different for a second ingress switching device 220. For example, assume that both the first ingress switching device 220 and the second ingress switching device 220 are eligible to receive authentication tokens, however, are different types of ingress switching devices 220, or the like. In this case, routing device 230 may provide different authentication tokens to the respective ingress switching devices 220. In this way, authentication device 250 may determine different authentication levels based on the different authentication tokens (e.g., whether the identity of the call is more susceptible to being spoofed, less susceptible to being spoofed, etc.).

In some implementations, routing device 230 may determine that the authentication condition is satisfied, and provide an authentication token in response to the first resolution query, as described below.

As further shown in FIG. 4, process 400 may include providing, to the first switching device, an authentication token based on the authentication condition being satisfied (block 430). For example, routing device 230 may provide, to ingress switching device 220, an authentication token based on the authentication condition being satisfied. In some implementations, the authentication token may be used by authentication device 250 to determine an authentication level associated with the call, as described elsewhere herein.

In some implementations, routing device 230 may provide, to ingress switching device 220, first routing information based on the first resolution query. In some implementations, the first routing information may include a routing address (e.g., a routing number (e.g., a telephone number), an IP address, a MAC address, or the like). In some implementations, routing device 230 may translate, based on stored information, the dialed number to a routing address (e.g., information that identifies a particular network switching device 240 to route the call).

In some implementations, the first routing information may include information that identifies particular network devices (e.g., network switching devices 240, or the like) that are to route the call. In some implementations, routing device 230 may determine an entity that is associated with the dialed number, and determine one or more network devices that are to route the call to the destination address based on the entity (e.g., one or more network devices associated with a particular entity, such as an interexchange carrier). As an example, routing device 230 may determine a carrier identification code (CIC) based on stored information and/or call information associated with the first resolution query (e.g., based on the dialed number, network device identifier of ingress switching device 220, and/or the like). For example, a CIC may identify a particular entity associated with the dialed number.

In some implementations, the first routing information may include the authentication token. For example, routing device 230 may adjust the call information to include the authentication token. As an example, routing device 230 may adjust a routing address to include the authentication token. Additionally, or alternatively, routing device 230 may adjust other call information (e.g., OLI information, screening information, or the like) to include the authentication token. In some implementations, the authentication token may be incapable of being provided via user device 210. For example, in the case where the authentication token is a routing address (e.g., such as a telephone number), the authentication token may be incapable of being dialed via user device 210. In this way, routing device 230 may generate an authentication token that may be more secure (e.g., trustworthy) than as compared to authentication tokens that may be provided via user device 210 (e.g., telephone numbers that may be dialed via user device 210).

In some implementations, ingress switching device 220 may receive, from muting device 230, the first routing information and/or the authentication token, and route the call to network switching device 240 (e.g., based on the first routing information, such as the CIC).

As further shown in FIG. 4, process 400 may include receiving, from a second switching device, a second resolution query that includes the authentication token (block 440). For example, authentication device 250 may receive, from network switching device 240, a second resolution query that includes the authentication token. In some implementations, network switching device 240 may receive the call from ingress switching device 220 (and/or another network switching device 240), and generate a second resolution query based on the call and/or the call information. For example, the second resolution query may include the call information, and/or the authentication token. In some implementations, network switching device 240 may generate the second resolution query for resolution of the call (e.g., to identify an endpoint device 260 for which to route the call).

As further shown in FIG. 4, process 400 may include determining, based on the second resolution query and/or the authentication token, an authentication level associated with the call (block 450). For example, authentication device 250 may determine, based on call information associated with the second resolution query and/or the authentication token, an authentication level associated with the call. In some implementations, an authentication level may be indicative of the likelihood of the identity of the call being spoofed (or alternatively not being spoofed). As described elsewhere herein, endpoint device 260 may receive the call, and perform particular actions based on the information that identifies the authentication level.

In some implementations, authentication device 250 may determine an authentication level based on the authentication token. For example, if authentication device 250 identifies the authentication token based on receiving the second resolution query, then authentication device 250 may determine a particular authentication level (e.g., that the call is pre-authenticated). Alternatively, if authentication device 250 does not identify the authentication token, then authentication device 250 may determine another authentication level (e.g., that identifies that the call is not pre-authenticated). Additionally, or alternatively, different authentication tokens may be indicative of particular authentication levels (e.g., low, medium, high, etc.).

Additionally, or alternatively, authentication device 250 may determine the authentication level based on call information (e.g., type of line information, address information, screening information, charging information, or the like). For example, authentication device 250 may determine particular authentication levels based on particular combinations of values associated with the call information (e.g., tuples). As an example, a first combination of particular call information may generate a first authentication level. Additionally, a second combination of particular call information may generate a second authentication level (e.g., that does not satisfy the first authentication level, or the like). In this way, endpoint device 260 may receive the call, determine different levels of authentication, and prompt user device 210 for particular information based on the different levels of authentication.

In some implementations, authentication device 250 may determine second routing information based on the second resolution query. For example, second routing information may include information that identifies a particular endpoint device 260 to which the call is to be routed. For example, authentication device 250 may determine an endpoint device 260 to route the call to, based on the routing address (e.g., the dialed telephone number), a user device identifier of user device 210 (e.g., the calling number), and/or other information associated with the request (e.g., a geographic location of user device 210, utilizations of particular endpoint devices 260, a time of day, or the like). In some implementations, the second routing information may include DNIS information. For example, DNIS information may include information that may enable endpoint device 260 to determine particular actions to take in association with the call (e.g., determine to invoke a particular voice menu, provide the call to a particular representative, request particular information, or the like).

In some implementations, authentication device 250 may adjust the second routing information to include information that identifies the authentication level. As an example, authentication device 250 may adjust a DNIS based on the authentication level. Alternatively, authentication device 250 may adjust a value associated with other call information to generate the information that identifies the authentication level (e.g., screening information, etc.).

As further shown in FIG. 4, process 400 may include providing, to the second switching device, information that identifies the authentication level (block 460). For example, authentication device 250 may provide, to network switching device 240, the second routing information and/or the information that identifies the authentication level associated with the call. In some implementations, network switching device 240 may receive the second routing information and/or the information that identifies the authentication level associated with the call, and route the call to endpoint device 260 (and/or another network switching device 240).

In some implementations, endpoint device 260 may receive the call, and perform a particular action based on the information that identifies the authentication level associated with the call (e.g., may process the call based on the information that identifies the authentication level). For example, endpoint device 260 may activate a particular voice menu, may lookup account information associated with user device 210, may provide a greeting to be output by user device 210, may route the call to a customer representative, or the like. In some implementations, endpoint device 260 may provide a prompt for particular information based on the information that identifies the authentication level (e.g., request a user of user device 210 to input particular information, such as account information, PIN information, etc.). Alternatively, endpoint device 260 may not provide a prompt for particular information (e.g., where the authentication level satisfies a threshold, or the like).

In this way, endpoint device 260 may receive the call, and determine an authentication level associated with the call based on the information that identifies the authentication level. Additionally, in this way, endpoint device 260 may perform particular actions based on particular authentication levels.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may enable an endpoint device to determine an authentication level associated with a call based on network provided information. In this way, implementations described herein may reduce a quantity of call processing required by endpoint devices (e.g., by enabling endpoint devices to determine an authentication level, and minimize requests to user devices for additional information). Thus, implementations described herein minimize call times, and thereby conserve processor and/or memory resources of user devices and/or endpoint devices, and/or may conserve network resources. Additionally, implementations described herein reduce an amount of processing of spoofed calls to endpoint devices, and/or may reduce an amount of additional calls associated with mitigating the effects of spoofed calls (e.g., associated with reporting malicious account transactions, rectifying the effects of spoofed calls, or the like), thereby conserving processor and/or memory resources of user devices, network devices, and/or conserving network resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, or the like), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, from a network device, a resolution query associated with a call,
the resolution query including a device identifier of the network device,
the network device to receive, from a user device, the call, and
the network device to provide, to the device, the resolution query based on a number associated with the call;
determine, based on the device identifier of the network device, whether an authentication condition is satisfied,
the authentication condition relating to whether the network device is associated with a service provider that is associated with the number associated with the call; and
selectively provide, to the network device, an authentication token in association with the resolution query based on determining whether the authentication condition is satisfied,
the authentication token to enable an endpoint device, associated with the call, to perform a particular action based on the call.

2. The device of claim 1, where the one or more processors, when determining whether the authentication condition is satisfied, are to:
determine that the authentication condition is satisfied when the network device is associated with the service provider that is associated with the number associated with the call, and
where the one or more processors, when selectively providing, to the network device, the authentication token, are to:
provide the authentication token in association with the resolution query based on determining that the authentication condition is satisfied.

3. The device of claim 1, where the one or more processors are further to:
determine, based on the device identifier of the network device, that the network device is a particular type of network device,
where the one or more processors, when determining whether the authentication condition is satisfied, are to:
determine that the authentication condition is satisfied based on the network device being the particular type of network device, and
where the one or more processors, when selectively providing the authentication token, are to:
provide the authentication token in association with the resolution query based on determining that the authentication condition is satisfied.

4. The device of claim 1, where the one or more processors are further to:
determine a routing address based on the resolution query, and
where the one or more processors, when selectively providing the authentication token, are to:
provide the authentication token in association with the resolution query,
the routing address including the authentication token.

5. The device of claim 1, where the one or more processors
are further to:
determine a carrier identification code based on the authentication condition being satisfied, and
where the one or more processors, when selectively providing the authentication token, are to:
provide the authentication token and the carrier identification code based on determining that the authentication condition is satisfied.

6. The device of claim 1, where the one or more processors are further to:
  determine, based on the device identifier of the network device, that the network device is associated with the endpoint device; and
  determine, based on the device identifier of the network device, that the network device is a particular type of network device, and
  where the one or more processors, when determining whether the authentication condition is satisfied, are to:
    determine that the authentication condition is not satisfied based on the network device being the particular type of network device,
      the authentication token not being provided to the network device based on the authentication condition not being satisfied.

7. The device of claim 1, where the call is a toll-free call.

8. A system, comprising:
  a first device to:
    receive, from a first network device, a first resolution query associated with a toll-free call,
      the first network device to receive, from a user device, the toll-free call;
    determine, based on the first resolution query, that an authentication condition is satisfied; and
    provide, to the first network device, an authentication token based on the authentication condition being satisfied,
      the first network device to provide the toll-free call to a second network device; and
  a second device to:
    receive, from the second network device, a second resolution query that includes the authentication token;
    determine, based on the authentication token, an authentication level associated with the toll-free call; and
    provide, to the second network device, information that identifies the authentication level,
      the second network device to provide the toll-free call, including the information that identifies the authentication level, to an endpoint device, and
      the endpoint device to perform an action based on the information that identifies the authentication level.

9. The system of claim 8, where the second device is further to:
  determine dialed number identification service information based on the second resolution query; and
  adjust the dialed number identification service information based on the authentication token, and
  where the second device, when providing the information that identifies the authentication level, is to:
    provide the information that identifies the authentication level based on adjusting the dialed number identification service information.

10. The system of claim 8, where the second device is further to:
  receive call information based on the second resolution query,
  where the second device, when determining the authentication level, is to:
    determine the authentication level based on the call information.

11. The system of claim 8, where the first device is further to:
  determine a point code associated with the first network device; and
  determine, when determining that the authentication condition is satisfied, that the authentication condition is satisfied based on the point code, and
  where the first device, when providing the authentication token, is to:
    provide the authentication token based on the authentication condition being satisfied.

12. The system of claim 8, where the first device is further to:
  identify a toll-free number based on the first resolution query;
  identify an entity associated with the toll-free number; and
  determine that the first network device is associated with the entity, and
  determine, when determining that the authentication condition is satisfied, that the authentication condition is satisfied based on the first network device being associated with the entity.

13. The system of claim 8, where the first device is further to:
  determine a type associated with the first network device; and
  determine, when determining that the authentication condition is satisfied, that the authentication condition is satisfied based on the type associated with the first network device, and
  where the first device, when providing the authentication token, is to:
    provide the authentication token based on the authentication condition being satisfied.

14. The system of claim 8, where the second device is further to:
  determine at least one of:
    screening information,
    originating line information, or
    nature of address information,
  where the second device, when determining the authentication level, is to:
    determine the authentication level based on the screening information, the originating line information, or the nature of address information.

15. A method, comprising:
  receiving, by a device and from a network device, a resolution query based on a call,
    the resolution query including an authentication token,
      the authentication token being included in the resolution query based on the network device being associated with a service provider that is associated with a number associated with the call;
  determining, by the device and based on the authentication token, an authentication level associated with the call;
  determining, by the device and based on the resolution query, an endpoint device to receive the call; and
  providing, by the device and to the network device, information that identifies the authentication level and the endpoint device,
    the network device to provide the call to the endpoint device,
    the endpoint device to perform an action based on the information that identifies the authentication level.

16. The method of claim 15, further comprising:
  determining a calling number associated with a user device based on the resolution query, where determining the endpoint device comprises:
   determining the endpoint device based on the calling number associated with the user device,
      the endpoint device to determine an account of the user device based on the calling number.

17. The method of claim 15, further comprising:
determining dialed number identification service information based on the resolution query; and
adjusting the dialed number identification service information based on the authentication token, and
where providing the information that identifies the authentication level comprises:
   providing the information that identifies the authentication level based on adjusting the dialed number identification service information.

18. The method of claim 15, where the call is a toll-free call.

19. The method of claim 15, where the endpoint device is an interactive voice response device.

20. The method of claim 15, further comprising:
identifying call information based on the resolution query,
where determining the authentication level associated with the call comprises:
   determining the authentication level based on the call information.

\* \* \* \* \*